(12) United States Patent
Giordano et al.

(10) Patent No.: US 9,465,521 B1
(45) Date of Patent: Oct. 11, 2016

(54) EVENT BASED MEDIA INTERFACE

(71) Applicant: MiMedia, Inc., Brooklyn, NY (US)

(72) Inventors: Christopher Giordano, New York, NY (US); Gordon C. Mackenzie, III, Providence, RI (US); Mel Reyes, Katonah, NY (US); Nick Faulkner, New York, NY (US); Jourdan Urbach, Brooklyn, NY (US)

(73) Assignee: MiMedia, Inc., Brooklyn, NY (US)

( * ) Notice: Subject to any disclaimer, the term of this patent is extended or adjusted under 35 U.S.C. 154(b) by 477 days.

(21) Appl. No.: 13/801,506

(22) Filed: Mar. 13, 2013

(51) Int. Cl.
*G06F 17/30* (2006.01)
*G06F 3/0484* (2013.01)

(52) U.S. Cl.
CPC ....... *G06F 3/0484* (2013.01); *G06F 17/30056* (2013.01); *G06F 17/30997* (2013.01); *G06F 17/30058* (2013.01)

(58) Field of Classification Search
CPC ............. G06F 3/0482; G06F 11/1448; G06F 17/30056; G06F 17/30058; G06F 17/30064; G06F 17/30274; G06F 17/3028; G06F 17/30997; H04L 67/306
USPC ....... 715/716, 719, 727, 738, 757, 810, 833, 715/794; 707/640, 827
See application file for complete search history.

(56) References Cited

U.S. PATENT DOCUMENTS

| | | |
|---|---|---|
| 5,778,395 A | 7/1998 | Whiting et al. |
| 5,835,953 A | 11/1998 | Ohran |
| 5,926,624 A | 7/1999 | Katz et al. |
| 6,212,512 B1 | 4/2001 | Barney et al. |
| 6,480,867 B1 | 11/2002 | Kwan |
| 7,035,943 B2 | 4/2006 | Yamane et al. |
| 7,346,512 B2 | 3/2008 | Li-Chun Wang et al. |
| 7,509,684 B2 | 3/2009 | McDonald et al. |
| 7,660,834 B2 | 2/2010 | Cannon et al. |
| 7,673,240 B2 | 3/2010 | Morgan |
| 7,685,175 B2 | 3/2010 | Carroll et al. |
| 7,873,040 B2 | 1/2011 | Karlsgodt |
| 8,090,690 B2 | 1/2012 | Zamkoff et al. |
| 8,095,606 B1 | 1/2012 | Wiley et al. |

(Continued)

OTHER PUBLICATIONS

Conner, N., "Using iTunes® 10", (Jan. 25, 2011), Que, p. 14 and p. 129.

(Continued)

*Primary Examiner* — Jeffrey A Gaffin
*Assistant Examiner* — Rinna Yi
(74) *Attorney, Agent, or Firm* — Norton Rose Fulbright US LLP

(57) ABSTRACT

Systems and methods which provide an event based media interface operable to organize digital media content for presentation to a user based upon predefined events are shown. A user may define an event epoch, such as may comprise an event designator, temporal criteria, location criteria, content criteria, etc., whereby digital media content associated with the event epoch is organized into an event collection. Various aspects of the event collection, such as relative event significance level, sharing scope, contributor group, etc., may be used to facilitate control with respect to the event collections of event epochs of embodiments herein. The event content of event collections herein may comprise digital photographs, videos, sound files, documents, etc., alone or in combination. An event gallery may be utilized to provide a user interface in which event content of one or more event collection is presented.

63 Claims, 7 Drawing Sheets

(56) References Cited

U.S. PATENT DOCUMENTS

| | | | |
|---|---|---|---|
| 8,135,800 B1* | 3/2012 | Walsh et al. | 709/217 |
| 8,209,540 B2 | 6/2012 | Brouwer et al. | |
| 8,554,735 B1 | 10/2013 | Wible et al. | |
| 2002/0083366 A1 | 6/2002 | Ohran | |
| 2002/0087588 A1 | 7/2002 | McBride et al. | |
| 2002/0133387 A1 | 9/2002 | Wilson et al. | |
| 2003/0038834 A1 | 2/2003 | Wen et al. | |
| 2003/0055671 A1 | 3/2003 | Nassar | |
| 2003/0098894 A1 | 5/2003 | Sheldon et al. | |
| 2003/0122879 A1* | 7/2003 | Inui | G09G 5/14 715/853 |
| 2004/0158546 A1 | 8/2004 | Sobel et al. | |
| 2004/0177319 A1 | 9/2004 | Horn | |
| 2004/0193672 A1 | 9/2004 | Samji et al. | |
| 2004/0236859 A1 | 11/2004 | Leistad et al. | |
| 2005/0071392 A1 | 3/2005 | Sandorfi et al. | |
| 2005/0102635 A1 | 5/2005 | Jiang et al. | |
| 2005/0108253 A1* | 5/2005 | Metsatahti et al. | 707/100 |
| 2005/0114595 A1 | 5/2005 | Karr et al. | |
| 2005/0131902 A1 | 6/2005 | Saika | |
| 2005/0131990 A1 | 6/2005 | Jewell | |
| 2005/0138066 A1* | 6/2005 | Finke-Anlauff et al. | 707/104.1 |
| 2005/0223277 A1 | 10/2005 | Ballard | |
| 2006/0015637 A1 | 1/2006 | Chung | |
| 2006/0036611 A1 | 2/2006 | Rothschild | |
| 2006/0155790 A1 | 7/2006 | Jung et al. | |
| 2006/0161635 A1 | 7/2006 | Lamkin et al. | |
| 2006/0179079 A1 | 8/2006 | Kolehmainen | |
| 2006/0195512 A1 | 8/2006 | Rogers et al. | |
| 2006/0220986 A1* | 10/2006 | Takabe | H04N 5/44543 345/9 |
| 2006/0224602 A1 | 10/2006 | Rawat et al. | |
| 2006/0230440 A1 | 10/2006 | Wu et al. | |
| 2006/0242325 A1 | 10/2006 | Ramaswamy et al. | |
| 2006/0277123 A1 | 12/2006 | Kennedy et al. | |
| 2006/0288168 A1 | 12/2006 | Stevenson | |
| 2006/0291720 A1 | 12/2006 | Malvar et al. | |
| 2007/0048714 A1 | 3/2007 | Plastina et al. | |
| 2007/0055993 A1 | 3/2007 | Braun et al. | |
| 2007/0088678 A1* | 4/2007 | Farago et al. | 707/3 |
| 2007/0106714 A1 | 5/2007 | Rothbarth | |
| 2007/0122111 A1 | 5/2007 | Yamamoto et al. | |
| 2007/0130400 A1 | 6/2007 | Reisman | |
| 2007/0288536 A1 | 12/2007 | Sen et al. | |
| 2007/0296581 A1 | 12/2007 | Schnee et al. | |
| 2008/0022058 A1 | 1/2008 | Nadathur et al. | |
| 2008/0040139 A1 | 2/2008 | Pousti et al. | |
| 2008/0060069 A1 | 3/2008 | Vindici | |
| 2008/0082678 A1 | 4/2008 | Lorch et al. | |
| 2008/0109414 A1 | 5/2008 | Chun et al. | |
| 2008/0115071 A1 | 5/2008 | Fair | |
| 2008/0126303 A1* | 5/2008 | Park et al. | 707/3 |
| 2008/0133622 A1 | 6/2008 | Brown et al. | |
| 2008/0222734 A1 | 9/2008 | Redlich et al. | |
| 2008/0250190 A1 | 10/2008 | Johnson | |
| 2008/0270395 A1* | 10/2008 | Gossweiler, III et al. | 707/6 |
| 2008/0294453 A1 | 11/2008 | Baird-Smith et al. | |
| 2008/0301201 A1 | 12/2008 | Sugimoto et al. | |
| 2008/0306872 A1 | 12/2008 | Felsher | |
| 2008/0307314 A1 | 12/2008 | Cisler et al. | |
| 2008/0319856 A1 | 12/2008 | Zito et al. | |
| 2009/0006643 A1 | 1/2009 | Lee | |
| 2009/0019486 A1 | 1/2009 | Kalaboukis | |
| 2009/0022129 A1 | 1/2009 | Karaoguz et al. | |
| 2009/0024675 A1 | 1/2009 | Hewitt et al. | |
| 2009/0132921 A1 | 5/2009 | Hwangbo et al. | |
| 2009/0178003 A1 | 7/2009 | Fiedler | |
| 2009/0240735 A1 | 9/2009 | Grandhi et al. | |
| 2009/0252033 A1 | 10/2009 | Ramakrishnan et al. | |
| 2009/0271457 A1 | 10/2009 | Heller | |
| 2009/0282336 A1 | 11/2009 | Lindley et al. | |
| 2009/0327904 A1 | 12/2009 | Guzak et al. | |
| 2010/0094728 A1 | 4/2010 | Denning et al. | |
| 2010/0180213 A1 | 7/2010 | Karageorgos et al. | |
| 2010/0241731 A1 | 9/2010 | Du et al. | |
| 2010/0325549 A1 | 12/2010 | Gibson et al. | |
| 2011/0004683 A1 | 1/2011 | Kottomtharayil et al. | |
| 2011/0060994 A1 | 3/2011 | Maxwell et al. | |
| 2011/0060998 A1 | 3/2011 | Schwartz et al. | |
| 2011/0106910 A1 | 5/2011 | Grasset | |
| 2011/0243534 A1 | 10/2011 | Thomas et al. | |
| 2011/0309946 A1* | 12/2011 | Jonsson | H04M 1/72563 340/686.6 |
| 2012/0047119 A1 | 2/2012 | Kandekar et al. | |
| 2012/0054679 A1* | 3/2012 | Ma | H04N 21/4532 715/810 |
| 2012/0072956 A1 | 3/2012 | Thomas et al. | |
| 2012/0210220 A1* | 8/2012 | Pendergast et al. | 715/716 |
| 2012/0210351 A1 | 8/2012 | Nukala et al. | |
| 2012/0265604 A1 | 10/2012 | Corner et al. | |
| 2012/0330963 A1 | 12/2012 | Bartholomew | |
| 2013/0024582 A1 | 1/2013 | Rodrigues | |
| 2013/0061131 A1 | 3/2013 | Zito et al. | |
| 2013/0066856 A1 | 3/2013 | Ong et al. | |
| 2013/0173531 A1* | 7/2013 | Rinearson et al. | 707/608 |
| 2014/0188890 A1* | 7/2014 | Clifton et al. | 707/740 |

OTHER PUBLICATIONS

Linder, "Humyo offers 30GB of free online storage", Jun. 25, 2008, [retrieved on Jul. 23, 2013], retrieved from the Internet: URL: http://downloadsquad.switched.com/2008/06/25/humyor-offers-30gb-of-free-online-storage/, 1 page.

W3Schools.com, "AJAX Introduction", Apr. 19, 2010, [retrieved on Jul. 24, 2013], retrieved from the Internet: URL: http://web.archive.org/web/20100419011010/http://www.w3schools.com/ajax/ajax_intro.asp/, p. 1-2.

International Search Report and Written Opinion issued for PCT/US2010/036105, dated Jul. 13, 2010, 11 pages.

Apple Inc., "iTunes 8", © 2009, ver. 8.2.1.6, p. 1-14.

Pash, "Huymo Provides 30GB of Free Online Storage", Jun. 25, 2008, [retrieved from the Internet on Oct. 22, 2014], <URL http://lifehacker.com/397108/huymo-provides-30gb-of-free-online-storage/>, p. 1-9.

Unpublished U.S. Appl. No. 13/103,744 to Wible, et al., filed May 9, 2011 and entitled "Centralized Music Media Gallery."

Unpublished U.S. Appl. No. 13/103,720 to Wible et al., filed May 9, 2011 and entitled "Centralized Media Access Portal."

Newman, "Amazon Cloud Drive and Cloud Player: A Hands-On Tour", Mar. 29, 2011, <URL http://www.pcworld.com/article/223604/Amazon_Cloud_Drive_and_Cloud_Player_A_Hands_On_Tour.html/>, p. 1-3.

Apple, Inc., "ITunes 8", (C)2009, ver.8.2.1.6, p. 1-17.

* cited by examiner

EVENT BASED MEDIA INTERFACE

CROSS-REFERENCE TO RELATED APPLICATIONS

The present application is related to co-pending and commonly assigned U.S. patent application Ser. No. 13/103,693 entitled "Systems and Methods for Data Upload and Download," filed May 9, 2011, Ser. No. 13/103,720 entitled "Centralized Media Access Portal," filed May 9, 2011, and Ser. No. 13/801,443 entitled "Systems and Methods Providing Media-to-Media Connection," filed Mar. 13, 2013, the disclosures of which are incorporated herein by reference.

TECHNICAL FIELD

The invention relates generally to digital media and, more particularly, to providing event based media interfaces with respect to digital media content.

BACKGROUND OF THE INVENTION

With the proliferation of consumer electronics, such as personal computers having document generation and media content capabilities, digital video recorders, digital cameras, digital sound recorders, and smart devices having image and/or sound recording features readily available to capture various content, and personal digital media players and smart devices having image and/or sound reproduction features almost omnipresent to provide playback of the various content, the instances of digital media content created by and available to users is quite large. A user may, for example, generate and store numbers of digital documents, photographs, videos, sound files, etc.

Unfortunately, however, the organizational techniques employed for storing and thus later accessing such digital media content tends to be manual and relatively simplistic. For example, a user may employ a simple hierarchical folder or directory structure in which various digital media content is organized for storage and user access through their inclusion in a same folder. The level of organizational granularity provided with respect to such folders is typically not detailed (e.g., "my trip to Europe", "work documents", "videos", etc.). Implementing a fine level of granularity for content organizational structure using such folders is often not practical, requiring significant time to navigate the hierarchical folders and to manually sort the content. Moreover, such organizational structures are static, providing a fixed granularity of media access defined by the folder structure, unless and until the user takes steps to manually reorganize the folders.

Accordingly, the use of such digital media content is often not fulfilling and generally diminishes with time. For example, the time required to access content of interest is sometimes impractical, and even more so with the passage of time. With the stagnant nature of the content and its organization, the user often looses interest in the content as time goes on.

A technique used to provide access to media, such as digital photographs, in a way that is often more relevant to the user than the traditional folder based interface is the timeline interface. For example, a social media platform such as FACEBOOK may provide a timeline interface in which a member's digital photographs that have been uploaded to the platform are presented along a timeline to provide a temporal aspect to the media interface. Such a timeline interface, although providing an interface that is not limited to a hierarchical storage structure used with respect to the media, provides a fixed, continuous temporal chain of media. The user is unable to control the granularity of the presentation of media through the timeline interface or the organization of the media.

BRIEF SUMMARY OF THE INVENTION

The present invention is directed to systems and methods which provide an event based media interface operable to organize digital media content for presentation to a user based upon predefined events. For example, a user may define an event epoch, such as may comprise an event designator, temporal criteria, location criteria, content criteria, etc. (referred to herein as event criteria), whereby digital media content associated with the event epoch (referred to herein as event content) is organized into an event collection, such as using the event criteria of the event epoch. Various aspects of the event collection, such as relative event significance level, sharing scope, contributor group, etc. (referred to herein as event collection aspects), may be used to facilitate control with respect to the event collections of event epochs of embodiments herein.

An event collection created according to embodiments of the invention may comprise a homogeneous media collection (i.e., only media of a same type) or a heterogeneous media collection (i.e., media of different types). For example, the event content of event collections herein may comprise digital photographs, videos, sound files, documents, etc., alone or in combination. Moreover, the particular digital media content comprising the event content of any particular event collection may be provided and/or collected from a number of sources, including a user for which the event epoch was created, users associated with the event, a group of users with which the event collection is shared, public sources of digital media content, professional or commercial sources of digital media content, etc.

Digital media content may be identified as event content for one or more event collection through automated means, such as through the use of metadata, tags, automated content recognition (e.g., optical character recognition, face recognition, machine vision object recognition, etc.) and the aforementioned event criteria. Additionally or alternatively, users may manually identify digital media content as event content for one or more event collection. Such manually identified digital media content may be analyzed with respect to the foregoing event criteria to confirm its suitability as event content for a particular event collection. In operation according to embodiments of the invention, various contributors in addition to or in the alternative to a user which defines an event epoch may be enabled to contribute digital media content as event content of an event collection.

An event gallery is utilized according to embodiments of the invention to provide a user interface in which event content of one or more event collection is presented. In operation according to embodiments of the invention, event galleries provide user control with respect to the event content presentation granularity. For example, at a high level an event may be represented by one or some subset of the event content (e.g., a "thumbnail" representation), whereas at a lower level more or all of the event content may be represented. Embodiments of an event gallery operate to provide the event collections of a plurality of event epochs in a relative relationship. For example, an event gallery of embodiment herein may implement a temporal scale, whereby event collections are disposed along the scale in relation to their temporal criteria. The temporal scale may be expanded or contracted (e.g., the range of time lengthened or shortened), such as under control of a user, to thereby provide different event content presentation granularity and, correspondingly, differing levels of presentations for the event content of one or more event collection (e.g., more and/or different event collections come into/out of view, larger/smaller sets and subsets of event content of one or more event collections come into/out of view, etc.).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
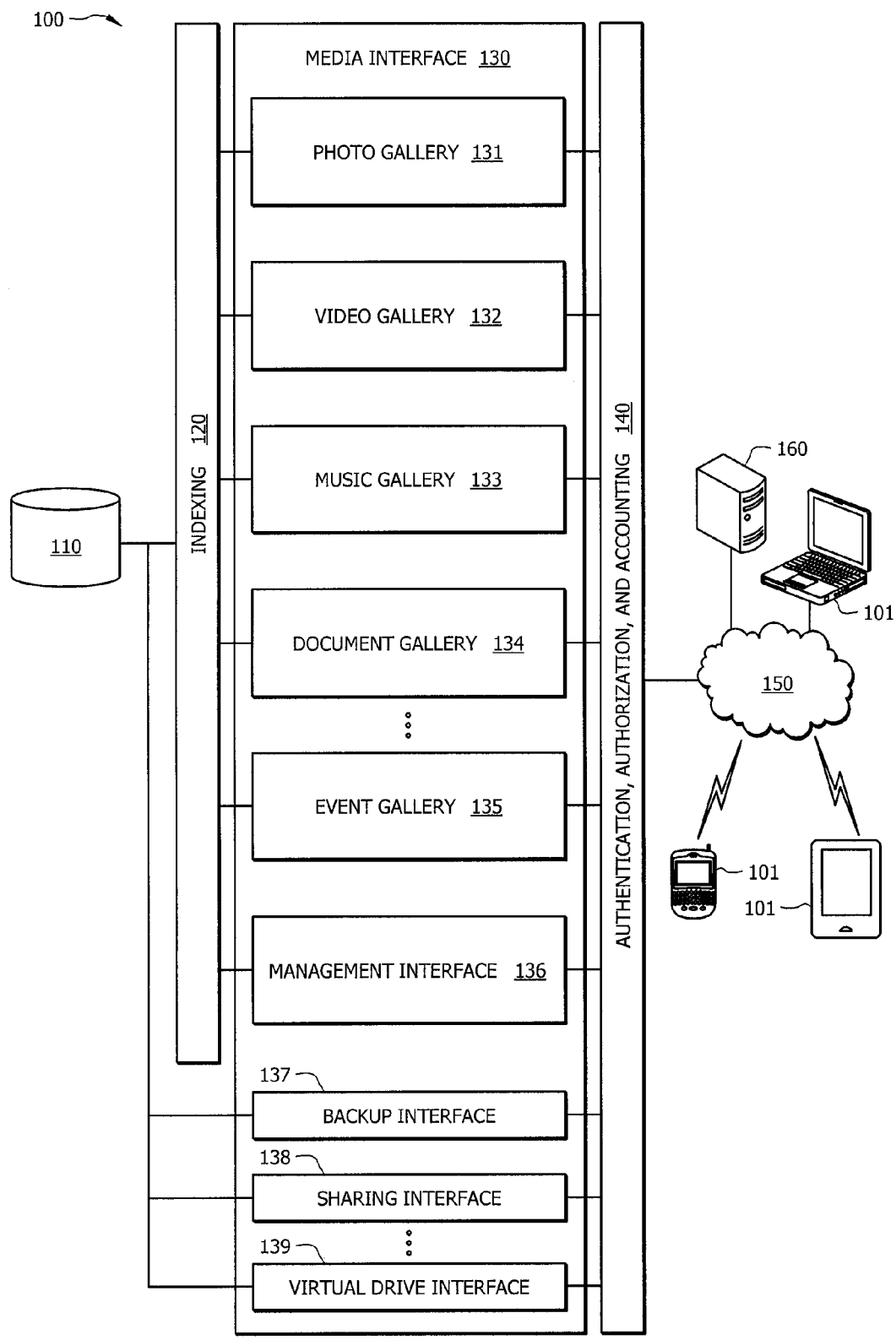
FIG. 1 shows a high level block diagram of a system adapted to provide event based organization of content according to embodiments of the invention.

FIG. 1 shows a high level block diagram of system 100 adapted to provide event based organization of content according to embodiments of the present invention. It should be appreciated that systems operable according to the concepts herein may comprise various configurations of digital media content storage, including local content storage, remote content storage, centralized content storage, distributed content storage, etc., wherein the content may comprise digital media content such as digital music, digital video, digital photos, multimedia files, digital books, office productivity files, etc. according to embodiments of the invention. The illustrated embodiment shows a network based mass storage configuration, such as may provide centralized storage of and access to users' libraries of content, such as may comprise the centralized media platform provided by MiMedia, Inc., Brooklyn, N.Y.

System 100 of the illustrated embodiment is shown coupled to network 150, such as may comprise a local area network (LAN), metropolitan area network (MAN), wide area network (WAN), wireless network (e.g., wireless local area network (WLAN), wireless metropolitan area network (WMAN), cellular network, etc.), the Internet, and/or the like, providing multiplatform access by user devices 101 to digital media content stored by database 110. Such user devices for which accessibility to digital media is provided may include, for example, personal computers (PCs), personal entertainment systems (PESs), personal digital assistants (PDAs), personal communication systems (PCSs) (e.g., "smart phones"), tablet devices, console devices, gaming devices, televisions, set top boxes, automobiles with media infrastructure, media display devices, etc. The access to digital media content provided to user devices 101 by system 100 of embodiments may be with and/or without the use of specialized clients.

Embodiments of system 100 are adapted for uploading and downloading digital media content as well as viewing and sharing digital media content with respect to a plurality of user devices. Accordingly, the illustrated embodiment of system 100 comprises database 110 for storing digital media content, indexing system 120 and content interface 130 for facilitating robust access to digital media content, and authentication, authorization, and accounting (AAA) system 140 for controlling access, all cooperating to provide viewing and sharing of digital media content for user devices 101 coupled to system 100 through network 150. Content interface 130 of the illustrated embodiment comprises a plurality of gallery interfaces (shown as photo gallery 131, video gallery 132, music gallery 133, and document gallery 134) providing content type based interfaces to digital media content stored in database 110 and one or more gallery interface (shown as event gallery 135) providing event based interfaces to digital media content stored in database 110. It should be appreciated that, unlike photo gallery 131, video gallery 132, music gallery 133 and document gallery 134, event gallery 135 of embodiments herein provides a content type independent interface to digital media content, thereby facilitating heterogeneous media presentation wherein the digital media content is organized by predefined events. Content interface 130 of the illustrated embodiment further includes a management interface (shown as management interface 136) facilitating management and control of various aspects of system 100 and/or the digital media content available thereto, a backup interface (shown as backup interface 137) facilitating introduction of digital media content into database 110 for archival storage, sharing interface 138 facilitating sharing of digital media content among users and user devices, and virtual drive interface 139 facilitating user device drive emulation for digital media content storage and access.

Some or all of indexing system 120, content interface 130, and AAA system 140 of embodiments herein may be implemented in software operable with respect to appropriate hardware circuitry. Accordingly, elements of embodiments of the present invention comprise code segments operable upon a computer system (e.g., a processor-based computer having memory, input/output, user interface, etc., as are well known in the art) to perform tasks as described herein. The code segments can be stored on a computer readable medium, such as random access memory (RAM), read only memory (ROM), magnetic memory, optical memory, etc., which may be accessed by a host computer system for executing the code. For example, code segments providing portions of indexing system 120, content interface 130, and/or AAA system 140 may be stored on a portion of database 110 for execution by a processor (not shown) of system 100. The computer system may comprise various subsystems, such as a network interface card (NIC), disk controller, cache memory, application specific integrated circuit (ASIC), etc., utilized in cooperation with the foregoing code segments for providing operation as described herein.

According to an operational aspect of system 100 of embodiments, digital media content stored by one or more of user devices 101 are communicated to a mass storage system of system 100, thereby providing backup of such digital media content on a network based mass storage system. For example, digital media content may be backed up to database 110 of system 100 through cooperative operation of AAA system 140 and backup interface 137 of content interface 130 using techniques as shown and described in the two above referenced patent application entitled "Systems and Methods for Data Upload and Download." Communication of the digital media content, or some portion thereof, to the network based mass storage system may be automated, such as to provide for periodic file backup, backup of modified files, etc.

In operation according embodiments of the invention, AAA system 140 may authenticate a user and/or user device as an appropriate client of system 100 and provide authorization to access an account, and thus digital media content and storage space, associated with the user and/or user device. AAA system 140 may additionally or alternatively provide accounting functions, such as to generate records regarding duration of access, size (e.g., bits/bytes) of data transferred, size (e.g. bits/bytes) of data stored, type of access, etc., such as for accounting (e.g., charge for services), statistical, load balancing, and/or other purposes.

Assuming access is granted by AAA system 140, backup interface 137 may operate to receive digital media content uploaded by a user device, associate the uploaded digital media content with the appropriate user account, and store the digital media content on database 110. In operation according to a preferred embodiment, backup interface 137 causes the digital media content to be stored on database 110 in a file structure which corresponds to the file structure employed by the user device. For example, a file and folder hierarchy employed by the user device when storing the digital media content is maintained when copies of those files are stored on database 110 by backup interface 137. The digital media content may thus be accessed, such as for restoring data to a user device, in a similar manner and using a same file navigation scheme as is native to the user device from which the digital media content were provided. System 100 of embodiments, therefore, provides a network based mass storage system for digital file backup. A user device may thus subsequently access system 100, being authenticated and authorized by AAA system 140 and utilizing backup interface 137, to access copies of various digital media content stored by database 110, wherein a file navigation structure consistent with that of the user device originally providing the files is used to locate desired files.

It should be appreciated that the digital media content stored by system 100 may be accessed by any of a number of user devices (e.g., any of user devices 101), whether the same as or different from the particular user device originally storing the files. Where a particular user elects to communicate the digital media content of a plurality of user devices (e.g., a plurality of user devices 101) to system 100, all such digital media content of the user may thus be consolidated (e.g., associated with a same user account by operation of AAA system 140). Access to all such digital media content may thus be provided by system 100 to all such files to any appropriate user devices. For example, indexing system 120 and one or more gallery interface (e.g., photo gallery 131, video gallery 132, music gallery 133, document gallery 134, and/or event gallery 135) of content interface 130 may cooperate to provide a multiplatform interactive online media experience facilitating a cohesive, online, mobile experience to all of a user's digital media content. In operation, digital media content stored by database 110 is indexed by indexing system 120 of system 100 to facilitate ready and meaningful access to the digital media content through an appropriate ones of photo gallery 131, video gallery 132, music gallery 133, and document gallery 134 as shown and described in the above referenced entitled "Centralized Media Access Portal."

In addition to or in alternative to providing the content type based gallery interfaces above, embodiments of the invention operate to organize the digital media content to present content to a user in one or more event based collection of digital media content. Accordingly, embodiments of indexing system 120 operate to provide organization of various forms of content including digital photographs, videos, sound files, documents, and/or the like in event collections comprising event content meeting various event criteria of predefined event epochs. For example, logic of indexing system 120 of the illustrated embodiment may operate to analyze the digital media content in association with the event criteria of a particular event epoch and to generate an event collection of digital media content which are relevant to the event. Such event collections may be presented to the user through event gallery 135.

Figure 2:
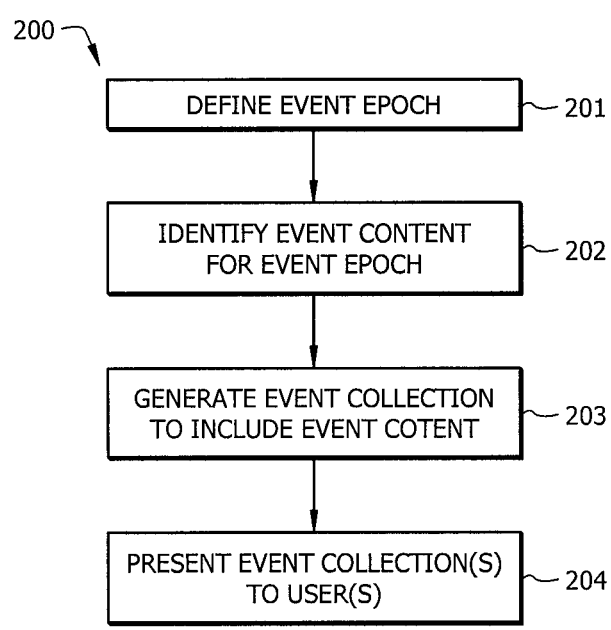
FIG. 2 shows operation of the system of FIG. 1 to provide presentation of digital media content in one or more event based collection according to embodiments of the invention.

Flow 200 of FIG. 2 shows operation of system 100 to provide presentation of digital media content in one or more event based collection according to embodiments of the invention. It should be appreciated that in operation of flow 200 it is presumed that one or more libraries of content, such as my include digital photographs, videos, sound files, documents, etc., are available for analysis and gathering into one or more thematic collection. For example, a user's digital media content libraries may be stored in database 110 (e.g., for archival backup purposes, for sharing, for multiplatform access, etc.) and made accessible to organizing system 122 of embodiments herein. Additionally or alternatively, digital media content may be available from any or all of user devices 101 and/or third party system 160 (e.g., publically available digital media content, professional or commercial sources of digital media content, social media, etc.).

System 100 of embodiments of the invention operates to provide an event based media interface which organizes digital media content for presentation to a user based upon predefined events. Accordingly, at block 201 of the illustrated embodiment of flow 200 an event epoch, from which an event collection may be generated, is defined. For example, a user may interface with logic of indexing system 120 through management interface 136 to define a desired event epoch. Such event epochs may be defined to represent any event relevant to a user, such as may comprise personal events (e.g., marriage, vacation, birth of a child, moving from one home to another home, graduation, holiday celebration, funeral, etc.) for the user or someone relevant to the user or community events (e.g., concert, parade, political rally, sporting event, weather disaster, etc.) experienced by the user or someone relevant to the user.

Figure 3:
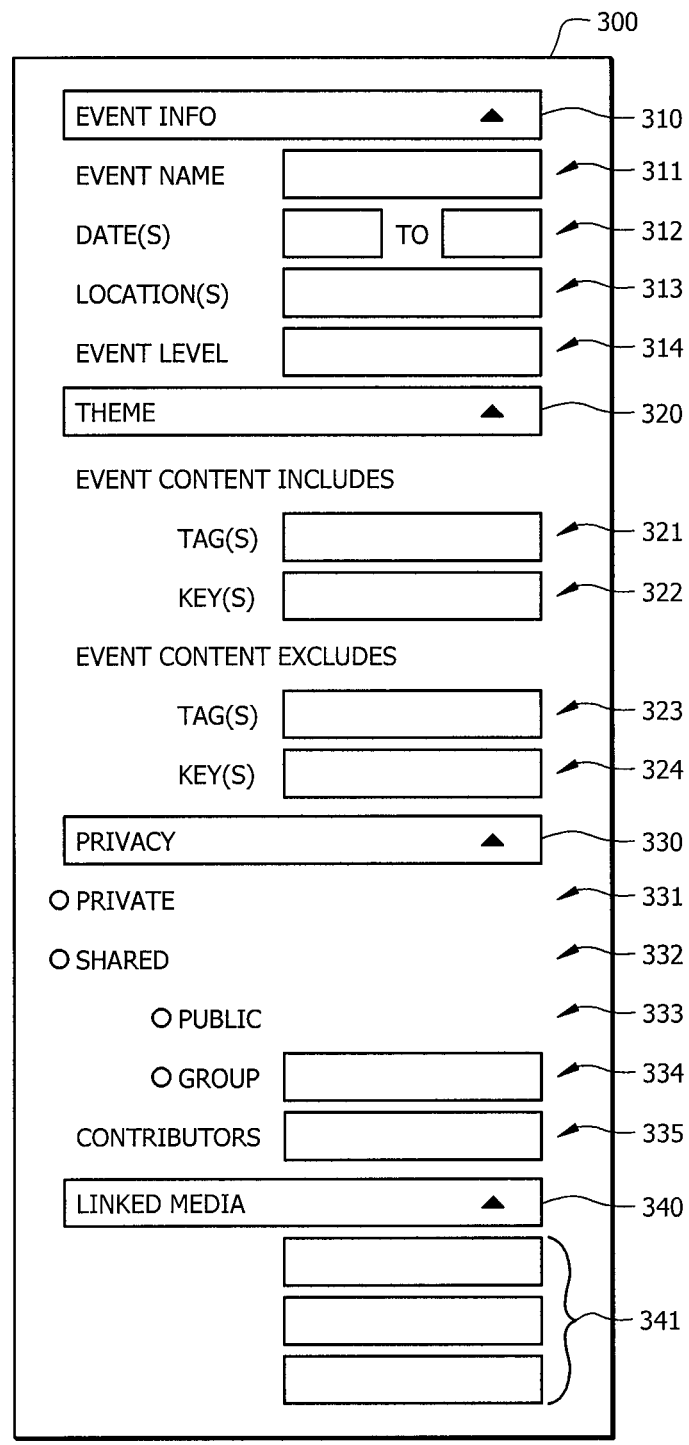
FIG. 3 shows a dialog box facilitating defining event epochs according to embodiments of the invention.

FIG. 3 shows dialog box 300 facilitating defining event epochs according to embodiments of the invention. Dialog box 300 of the illustrated embodiment comprises a plurality of collapsible informational areas for use in inputting, managing, and reviewing information for defining an event epoch. Specifically, the illustrated embodiment includes an event information collapsible information area controlled by event info menu bar 310, content thematic information collapsible information area controllable by theme menu bar 320, sharing and contributor information collapsible information area controllable by privacy menu bar 330, and event content identification information area controllable by linked media menu bar 340.

As can be appreciated from dialog box 300, the event epoch definition may comprise such information as an event designator (shown as event name 311), temporal criteria (shown as date(s) 312), location criteria (shown as location(s) 313), and content criteria (shown as included tag(s) 321, included key(s) 322, excluded tag(s) 323, and excluded key(s) 324) (collectively referred to herein as event criteria), whereby digital media content associated with the event epoch (referred to herein as event content) may be organized into an event collection using the event criteria of the event epoch. Various aspects of the event collection (referred to herein as event collection aspects) may be specified, such as using relative event significance level information (shown as event level 314), sharing scope (shown as private 331, shared 332, public 333, and group 334), contributor group (shown as contributors 335), in the event epoch definition for use in facilitating control with respect to the event collections of event epochs of embodiments herein.

Accordingly, at block 201 of flow 200, a user may provide various information to the appropriate fields of informational areas of dialog box 300 to define a desired event epoch. For example, the user may provide information for event name 311 (e.g., "Wedding", "Disneyland Vacation", "New York Flash Mob", etc.) to identify the event to the user and/or others in some meaningful way. The event name may include temporal data (e.g., date range, month, year, etc.), location data (e.g., geographic area, city, state, etc.), if desired. Some or all such data may be populated into the event name from other fields of the event epoch definition, such as through a checkbox or other indication for selecting inclusion of data from a selected field into the event name field.

Moreover, according to embodiments of the invention, the user provides temporal data for date(s) 312 to establish temporal criteria for the event epoch. For example, the user may specify a date or date range within which the event corresponding to the event epoch being defined occurred. It should be appreciated that although the illustrated embodiment of dialog box 300 shows "date(s)", the temporal aspects implemented according to the concepts herein are not limited to day/date granularity. For example, temporal data may establish an instance in time or a window of time from seconds to any desired period.

Likewise, the user provides location data for location(s) 313 to establish location criteria for the event epoch. For example, the user may specify one or more of geographic coordinates, a physical address, a landmark name, a city, a state, a country, a continent, an ocean or sea, etc. within which the event corresponding to the event epoch being defined occurred. It should be appreciated that the location data may comprise multiple locations or locals (e.g., multiple discrete locations, such as a plurality of cities visited during a vacation trip).

In operation according to embodiments of the invention, an event epoch includes at least temporal criteria and location criteria. Accordingly, the event content for each event collection of such embodiments of the invention would meet both the temporal criteria and location criteria of the event epoch. However, additional event criteria may also be utilized according to embodiments of the invention.

For example, embodiments herein may utilize various content criteria for facilitating a thematic event collection. As shown in the illustrated embodiment of dialog box 300, the content criteria may include event content inclusion data and/or event content exclusion data. For example, one or more tags may be specified as content criteria for including and/or excluding particular digital media content as event content. The digital media content of one or more library available to system 100 may have been tagged with information such as the subject matter included, the level of interest/relevance to the user, etc. Corresponding tag information may be provided at inclusion tag(s) 321, whereby digital media content having one or more such tags associated therewith will meet that aspect of the content criteria for inclusion as event content, or at exclusion tag(s) 323, whereby digital media content having one or more such tags associated therewith will meet that aspect of the content exclusion criteria for excluding the content as event content. Similarly, one or more keys may be specified as content criteria for including and/or excluding particular digital media content as event content. The digital media content, its metadata, etc., may include various key information such as may comprise key words, persons or objects used as keys, etc. Corresponding key information may be provided at inclusion key(s) 322, whereby digital media content having one or more such keys therein will meet that aspect of the content criteria for inclusion as event content, or at exclusion key(s) 324, whereby digital media content having one or more such keys therein will meet that aspect of the content exclusion criteria for excluding the content as event content.

Embodiments of the invention may utilize various event collection aspects to provide control with respect to the event collection. For example, dialog box 300 of the illustrated embodiment includes event collection aspects for controlling the scope of the availability of the event collection. Specifically, private 331 may be selected by a user in order to designate the event collection as available only to the user or owner of the event collection. Alternatively, shared 332 may be selected by a user in order to designate the event collection as available to a group beyond the user or owner of the event collection. Public 333 and group 334 may be selected to control the scope of the sharing facilitated by shared 332. For example, where public 333 is selected by a user, the event collection may be made available to all users of a particular universe (e.g., users of system 100, users connected by network 150, etc.). Where group 334 is selected by a user, the event collection may be made available to the users of a particular group or groups (e.g., the individual users identified in association with group 334, a group of users "friended" with the user or owner of the event collection, a group of contributors to the event collection, etc.). A user may be enabled to control various aspects of the sharing, such as to allow contributors or others with which the content is shared to comment on the various digital media content, to allow some or all of the shared content to be copied or downloaded, to allow further sharing of the shared content with others, etc.

Another example of event collection aspects utilized according to embodiments of the invention is contributors 335 used to define the users or other entities able to contribute digital media content to the event collection. Information provided in association with contributors 335 may identify (e.g., by specifying a user name, a user account a network address, digital media content library path, etc.) particular users (e.g., the user or owner of the event collection, one or more users identified in association with group 334, one or more users "friended" with the user or owner of the event collection, etc.) and/or their digital media content from which digital media content may be collected for inclusion in the event collection. It should be appreciated that the contributors need not be individuals or even have shared access to the event collection. For example, a public source of digital media content, a professional or commercial source of digital media content, etc., may be designated as a contributor (e.g., by specifying a network address, digital media content library path, etc.) according to embodiments herein to facilitate collection of digital media content for an event collection. Moreover, contributors need not be a member or subscriber of a host service (e.g., the aforementioned centralized media platform providing a network based mass storage system) according to embodiments herein.

The access provided to the various users of the event collections may be controlled, such as using the aforementioned event collection aspects, to not only control sharing of the event content, but to control the particular access enabled by the sharing. For example, a particular user or group of users (e.g., contributors) may be enabled to not only view the event content, but also to copy or download the event content. However, another user or group of users (e.g., users other than contributors) may be enabled only to view the event content.

It should be appreciated that logic of AAA system 140 may operate to implement and enforce various event collection aspects which provide access control. For example, AAA system 140 may authenticate a user and/or user device as an appropriate client of system 100 and provide authorization for particular levels of access with respect to one or more event collection.

Still another example of event collection aspects utilized according to embodiments of the invention is event level 314 used to establish a relative event significance level for the event collection. For example, various event levels may be defined (e.g., low, mid, high or levels 1-5) which may be selected in association with event level 314 to establish a relative hierarchy of event collections for a user or other owner of a plurality of event collections. Such hierarchical data may be utilized in determining the prominence of an event collection or its event content with respect to other event collections or their event content (e.g., foreground/background presentation), the presence of an event collection or its event content at particular levels of event content presentation granularity (e.g., expanded temporal scope/contracted temporal scope), etc., as discussed in further detail below.

Continuing with exemplary flow 200 of FIG. 2, having defined the desired event epoch, event content for the event epoch is identified at block 202. In operation according to embodiments, automated means may be utilized to identify digital media content as event content for one or more event collection. For example, operation of logic of indexing system 120 may analyze metadata, tags, keys, etc. of digital media content of one or more library of the contributors identified by contributors 335 to identify digital media content meeting the event criteria. The metadata may, for example, provide information relevant to event criteria such as temporal criteria (e.g., when a photograph or video was taken, when a document was created or edited, etc.), location criteria (e.g., geographic coordinates where a photograph or video was taken, the location of a system on which a document was created or originated, etc.), and the like. The tags may provide information relevant to event criteria such as temporal criteria (e.g., a holiday tagged in a photograph or video), location criteria (e.g., a location tagged in a photograph or video), content criteria (e.g., digital media content tagged with one or more selected tags), and the like. The keys may provide information relevant to event criteria such as temporal criteria (e.g., machine vision object recognition to identify temporally relevant objects, such as a Christmas tree, optical character recognition to identify temporally relevant information, such as appearing on a calendar or other object included in the digital media content), location criteria (e.g., machine vision object recognition to identify location relevant objects, such as a landmark, optical character recognition to identify location relevant information, such as appearing on a sign or other object included in the digital media content), content criteria (e.g., machine vision object recognition to identify an object relevant to the event subject matter, face recognition to identify persons relevant to the event subject matter), and the like.

Users (e.g., a user or owner of the event collection, contributors to the event collection, etc.) of embodiments of the invention may additionally or alternatively manually identify digital media content as event content for one or more event collection. For example, a user may interface with logic of indexing system 120 through management interface 136 to identify particular digital media content as event content for an event collection. In operation according to an embodiment, a user may select one or more digital media content file and "drag-and-drop" the selected digital media content file (e.g., to drop the digital media content file in the event content identification information area associated with linked media menu bar 340 of dialog box 300) to identify that selected digital media content as event content for an event collection. Similarly, a user may input information (e.g., digital media content identification information, digital media content file name, digital media content file path, etc. input into event content information 341) for selected digital media content to identify that selected digital media content as event content for an event collection. Such manually identified digital media content may be analyzed, such as through operation of logic of indexing system 120 to analyze metadata, tags, keys, etc. of the manually identified digital media content, to confirm its suitability as event content for a particular event collection.

Continuing with exemplary flow 200 of FIG. 2, having identified various digital media content as event content for an event epoch, an event collection comprising some or all of the identified event content is generated. In operation according to embodiments of the invention, logic of indexing system 120 indexes the digital media content files for the digital media content identified as event content to facilitate ready access to the digital media content as an event collection. For example, digital media files may be stored in a mass storage system (e.g., database 110) in an arrangement (e.g., file folder hierarchy) corresponding to that of the user device originally storing the digital media files in order to facilitate use of the files as a backup data set (e.g., for restoring files and file structure). Accordingly, the appropriate digital media content files may be indexed to present particular files in one or more event collection accessible through an event gallery. Details with respect to operation to provide indexing as may be implemented according to embodiments of the invention is provided in the above referenced patent application entitled "Centralized Media Access Portal."

It should be appreciated that the foregoing indexing of the digital media content need not be implemented according to the concepts herein. For example, embodiments of indexing system 120 may operate to copy the digital media content identified as event content to create a new library of digital media content comprising the event collection. Such copying of digital media content results in higher usage of storage resources, as compared to the aforementioned indexing technique, due to the duplication of digital media content. However, the duplication ensures availability of the event content where access to the original digital media content cannot be ensured (e.g., where digital media content of the event collection is collected from external sources). Accordingly, embodiments of the invention may implement a hybrid event collection generation technique where a combination of indexing (e.g., digital media content of the user or owner of the event collection) and digital media content copying (e.g., digital media content from public, professional or commercial, and possibly even other contributors) is implemented.

The particular digital media content identified as event content which is included in the generated event collection may comprise all of the identified event content or some subset thereof. For example, a predetermined limit (e.g., number of digital media content, aggregate storage or bit size of the digital media content, etc.) may be implemented with respect to the event collection which operates to include only a subset of the digital media content identified as event content. Additionally or alternatively, one or more threshold parameters (e.g., user rating or ranking of the digital media content, size or quality of the digital media content, age or freshness of the digital media content, etc.) may be implemented with respect to the event collection which operates to include only a subset of the digital media content identified as event content.

Embodiments of the invention may operate to implement the event content identification of block 202 and the event collection generation of block 203 of flow 200 from time to time (e.g., periodically, upon the occurrence of an event, etc.). For example, event content may be identified and event collection generation performed periodically, such as one a day, once a week, once a month, in order to collect relevant digital media content that may have become available since a previous iteration of the event collection was generated, thereby keeping the event collection fresh. As another example, event content may be identified and event collection generation performed in response to an event, such as a contributor adding content to the event collection or a user changing or modifying an event criteria of the event epoch definition, thereby revising the event collection in light of the event. System 100 (e.g., logic of indexing system 120) may operate to provide notification (e.g., email, text, or other modes of alerts) to users (e.g., a user or owner of the event collection, contributors to the event collection, etc.) when event content has been added to an event collection.

As can be appreciated from the foregoing, an event collection created according to embodiments of the invention may comprise a homogeneous media collection (i.e., only media of a same type) or a heterogeneous media collection (i.e., media of different types). Accordingly, the event content of event collections herein may comprise digital photographs, videos, sound files, documents, etc., alone or in combination.

Having generated an event collection including event content, embodiments operate to provide a user interface through which one or more user may access and otherwise interact with the event collection. Accordingly, at block 204 of flow 200 illustrated in FIG. 2, one or more event collections, including the generated event collection, is presented to users (e.g., the user or owner of the event collection, a sharing group for the event collection, etc.). For example, logic of event gallery 135 may provide an interface between indexing system 120 and one or more of user devices 101 to provide access to event content presented as an event collection. Accordingly, event gallery 135 may be utilized according to embodiments of the invention to provide a user interface in which event content of one or more event collection is presented to users.

Embodiments of an event gallery operate to provide the event collections of a plurality of event epochs in a relative relationship. For example, an event gallery of embodiment herein may implement a temporal scale, whereby event collections and/or the event content thereof are disposed along the scale in relation to their temporal criteria.

Figure 4A:
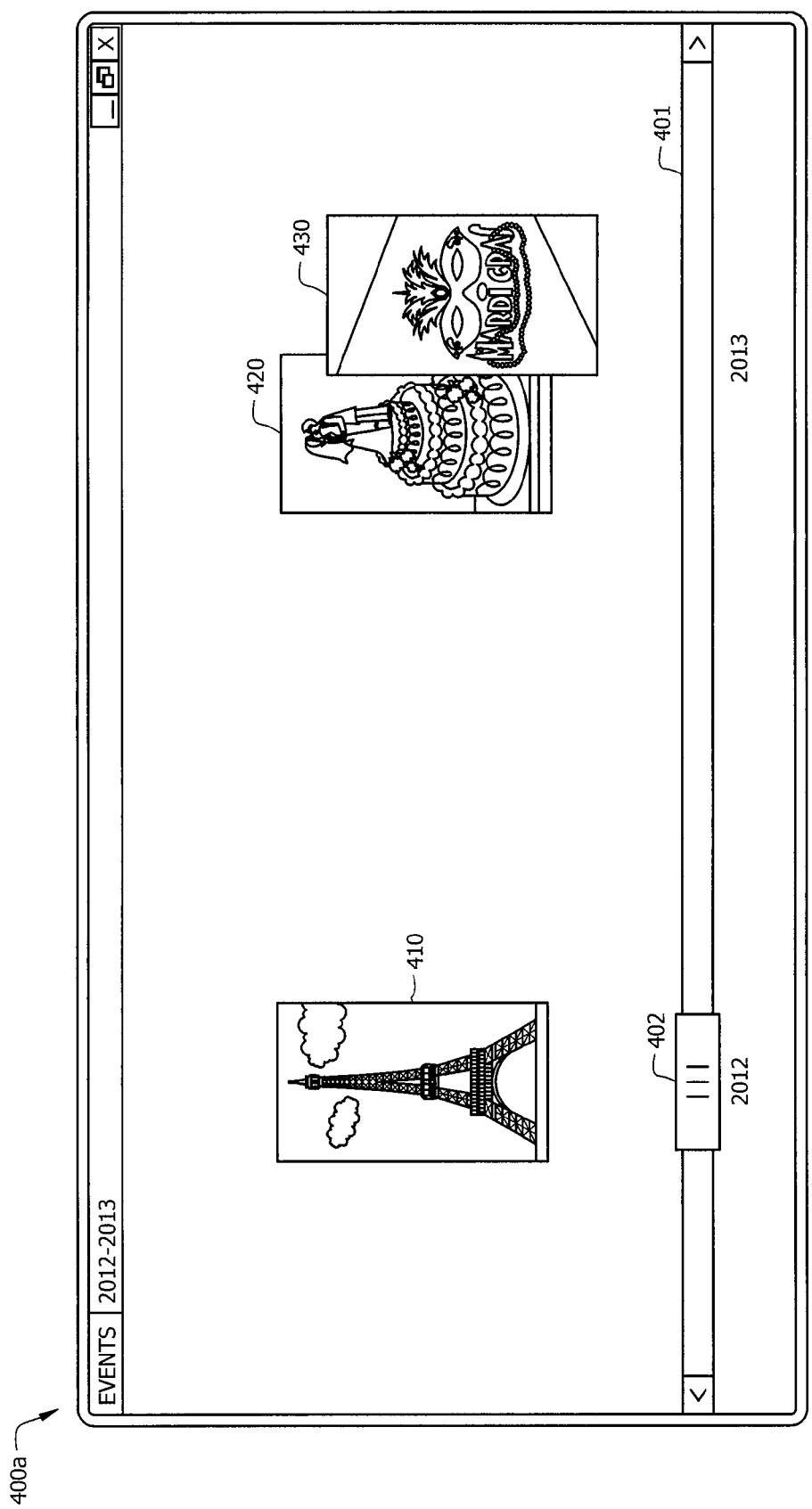
FIGS. 4A-4C show an event interface using a temporal scale as may be provided by an event gallery of embodiments of the invention.
Figure 4B:
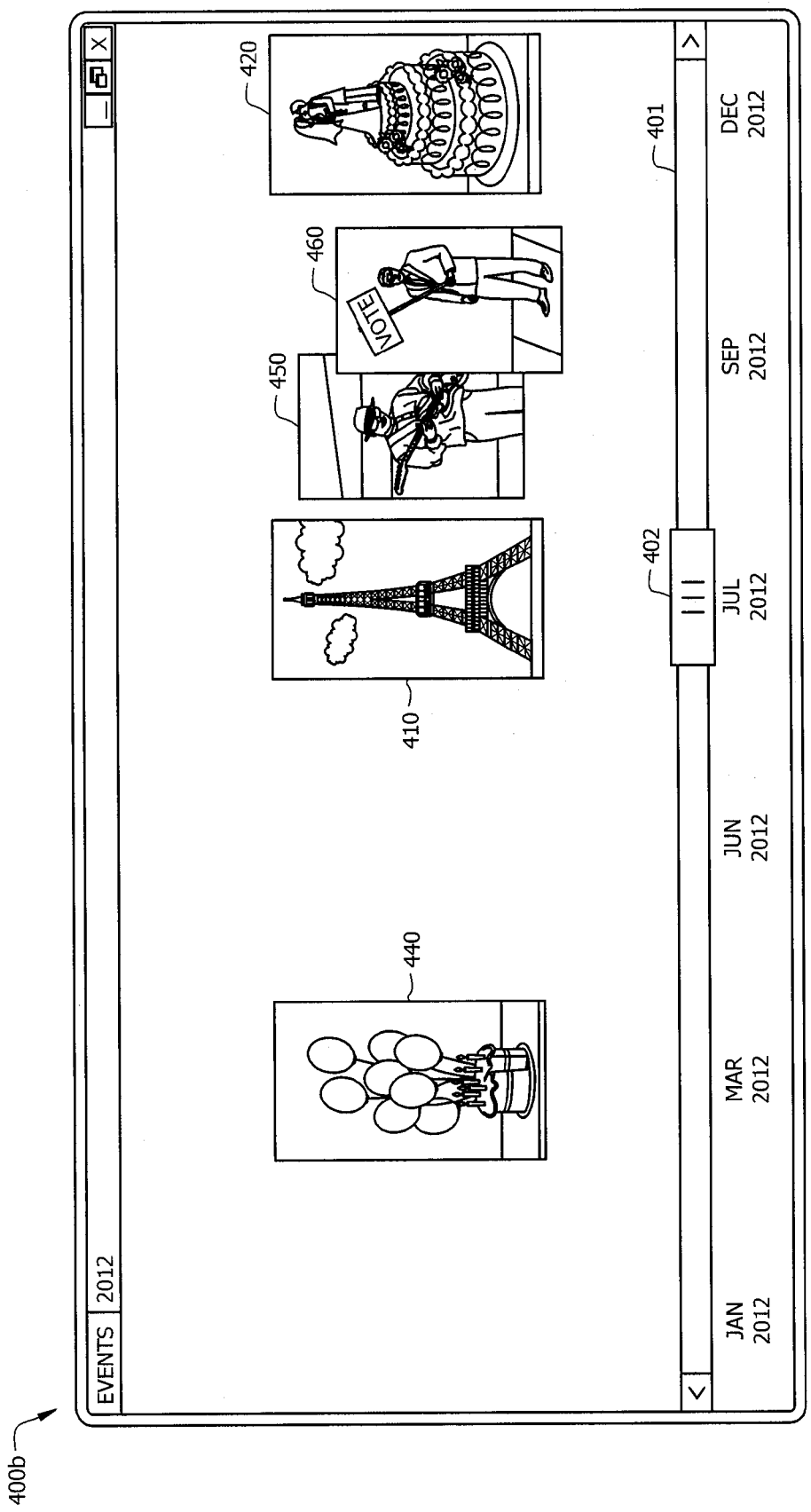
Figure 4C:
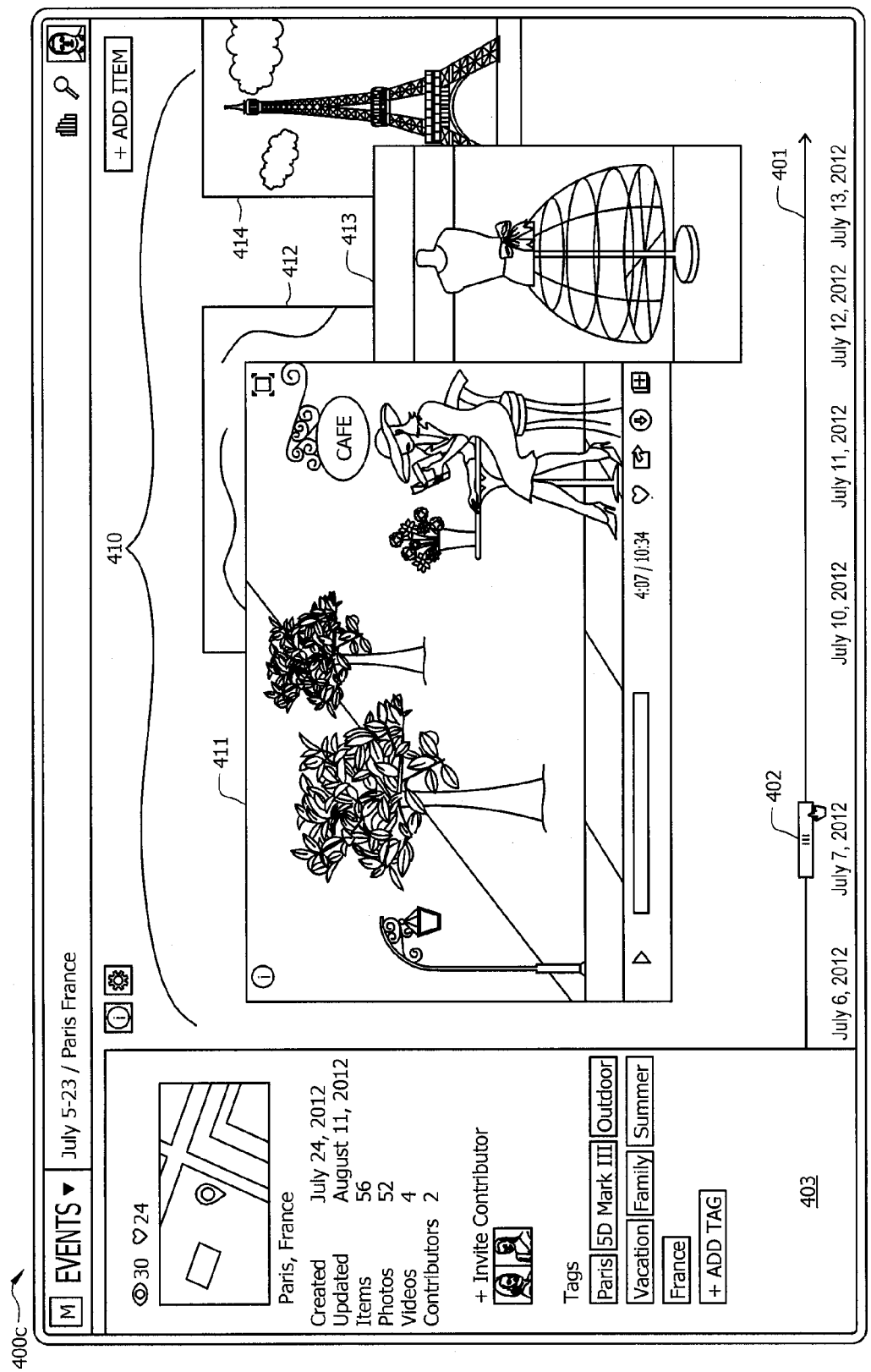

An exemplary embodiment of a temporal scale as may be provided by event gallery 135 is shown in FIGS. 4A-4C as event interface 400. The temporal scale representation provided by event interface 400 of the illustrated embodiment presents the users event collections and/or event content thereof in correspondence to temporal scale 401, whereby the temporal criteria of the event collection and event content determines where in relation to the temporal scale the content is presented. Slider 402 of the illustrated embodiment facilitates the user selecting a particular portion of the temporal scale, such as for obtaining additional information for the temporal period indicated by slider 402 (e.g., information 403 of FIG. 4C showing details for the corresponding event collection), for selecting an anchor point for expansion or contraction of the temporal scale, etc.

In the rendition of event interface 400 shown in FIG. 4A (designated in this figure event interface 400*a*), the scale of temporal scale 401 is expanded to cover a range of multiple years (e.g., 2012-2013). The granularity of the event collections presented by event interface 400 is adapted to correspond to the selected scale of temporal scale 401. Accordingly, at this relatively high level of scaling, events are represented by one of their event content (e.g., providing a "thumbnail" representation). In particular, event collection 410 (in this example providing a collection of content for an event epoch corresponding to a trip to Paris, France), event collection 420 (in this example providing a collection of content for an event epoch corresponding to a wedding), and event collection 430 (in this example providing a collection of content for an event epoch corresponding to the Mardi Gras celebration) are each represented as a thumbnail of their respective event content. For example, a single event content (e.g., a highest ranked or most relevant event content) may be selected to represent each event collection. In operation according to embodiments, such a selected event content is presented in event interface 400 as the digital media content itself (e.g., if the content comprises video the presentation is of a playable video event content, if the content is a photograph the content comprises an image of the photograph, etc.). Alternative embodiments may implement other event collection thumbnail configurations, such as to present a montage of the event content as the thumbnail.

It should be appreciated that relative hierarchy information for the event collections may be utilized in the presentation of event collections by event interface 400. For example, such relative hierarchy information may be utilized in determining the prominence of event collections 420 and 430. In the illustrated embodiment, the relative hierarchy information for event collection 420 (the wedding event) is higher than that of event collection 430 (the Mardi Gras celebration event), thereby resulting in event collection 420 being presented in the foreground and event collection 430 being presented in the background.

Such relative hierarchy information for the event collections may be utilized in the presentation of event collections by event interface 400 for purposes in addition to or in the alternative to the aforementioned foreground/background presentation. For example, the presence of an event collection or its event content at particular levels of event content presentation granularity may be controlled by relative hierarchy information.

In operation according to embodiments of the invention, event interface 400 provides user control with respect to the event content presentation granularity. For example, a user may expand or contract the scale represented by temporal scale 401, such as to go between the scale of multiple years represented in event interface 400*a* and the scale of a single year represented in event interface 400*b* or to go between the scale of a single year represented in event interface 400*b* and the scale of a portion of a month of the year in event interface 400*c* (shown in FIGS. 4A-4C). The relative hierarchy information may be utilized in determining the particular event collections to be presented by event interface 400 at the various scales of temporal scale 401 (e.g., more and/or different event collections come into/out of view, larger/smaller sets and subsets of event content of one or more event collections come into/out of view, etc.). For example, as between the scales represented in event interface 400*a* and event interface 400*b*, the granularity for the event collections is increased to include additional event collections having lower relative hierarchy information (e.g., event collection 440 representing a birthday event, event collection 450 representing a rock concert event, and event collection 460 representing a political rally event) in the temporal scale of event interface 400*b*. Similarly, as between the scales represented in event interface 400*b* and event interface 400*c*, the granularity for the event collections is increased to include event content for events corresponding to the temporal scale (e.g., event content 411-414 of event collection 410) in the temporal scale of event interface 400*c*. Accordingly, at a high level an event may be represented by one or some subset of the event content, whereas at a lower level more or all of the event content may be represented. Thus, in operation of event interface 400 the temporal scale may be expanded or contracted (e.g., the range of time lengthened or shortened), such as under control of a user, to thereby provide different event content presentation granularity and, correspondingly, differing levels of presentations for the event content of one or more event collection.

In operation according to embodiments, the event content presented by event interface 400 (e.g., as shown in event interface 400*c*) is presented as the digital media content itself (e.g., if the content comprises video the presentation is of a playable video event content, if the content is a photograph the content comprises an image of the photograph, etc.). Moreover, various features and functions of the digital media content so presented remain available to the user. For example, where media-to-media connections (such as shown and described in the above referenced patent application entitled "Systems and Methods Providing Media-to-Media Connection," have been established with respect to one or more event content of an event collection, those media-to-media connections remain viable and operable (e.g., to provide corresponding access or operation with respect to connected digital media content).

Figure 5:
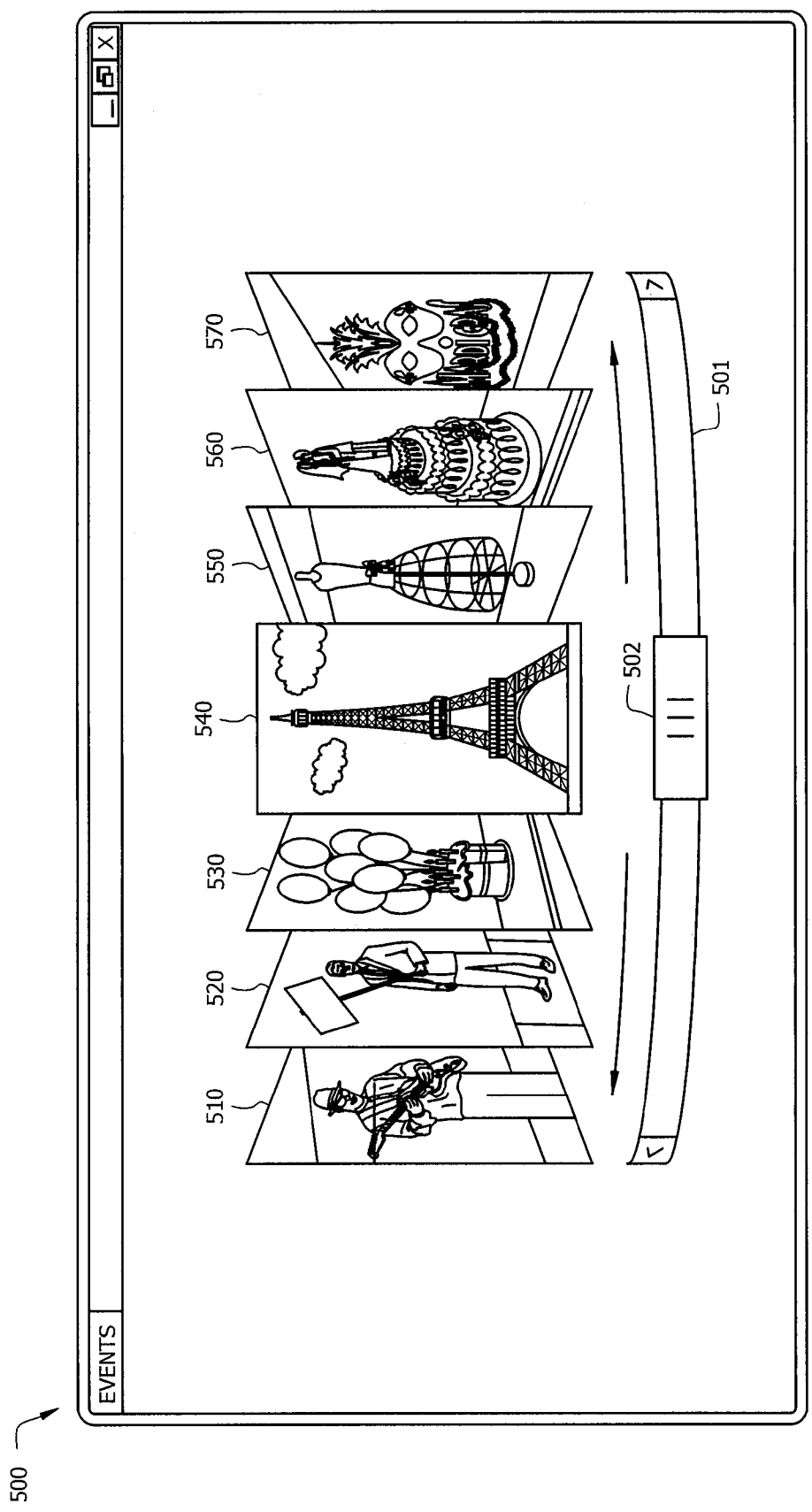
FIG. 5 shows a carousel event interface using a temporal scale as may be provided by an event gallery of embodiments of the invention.

It should be appreciated that the concepts of the present invention are not limited to the particular form of the event interface illustrated in the exemplary embodiment illustrated in FIGS. 4A-4C. For example, embodiments may implement a carousel format, whether in association with a temporal scale or not, for presenting event collections and/or event content thereof. An exemplary embodiment of a carousel format implemented in association with a temporal scale as may be provided by event gallery 135 is shown in FIG. 5 as event interface 500. The event interface 500 includes a slider 502. The carousel temporal scale representation provided by event interface 500 of the illustrated embodiment presents the users event collections and/or event content thereof (represented by event collections 510-570) in correspondence to temporal scale 501, whereby the temporal criteria of the event collection and event content determines where in relation to the temporal scale the content is presented.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   identifying digital media content as event content for a plurality of predefined event epochs, wherein each of the predefined event epochs comprise predefined event criteria including a temporal aspect and a location aspect, wherein the event content includes digital media content of a first user stored in association with a first user account, wherein, when a second user is designated as a contributor of event content by the first user, the event content includes digital media content of the second user stored in association with a second user account, and wherein the second user is different from the first user;
   generating collections of digital media content as a plurality of event collections from the event content of corresponding event epochs of the plurality of predefined event epochs, wherein, based on the designation of the second user as a contributor, at least one event collection of the plurality of event collections comprises at least a portion of the digital media content of the first user and at least a portion of the digital media content of the second user; and presenting, by operation of a processor-based system, one or more event collections of the plurality of event collections at a user device of the first user in relation to a temporal scale, wherein presenting the one or more event collections includes:
  determining hierarchy information associated each of the plurality of predefined event epochs;
  determining a prominence associated with each of the one or more event collections based on the hierarchy information, wherein the prominence indicates whether a particular event collection is presented in the foreground or background relative to other event collections of the one or more event collections; and
  accessing, during presentation of the at least one event collection, the first user account and the second user account to present at least the portion of the digital media content of the first user and at least the portion of the digital media content of the second user.

2. The method of claim 1, wherein the digital media content identified as event content and presented in a same event collection comprises a plurality of different digital media.

3. The method of claim 2, wherein the plurality of different digital media comprises at least two media types from the group consisting of photographs, videos, sound files, and documents.

4. The method of claim 1, wherein the digital media content from which the event content is identified comprises digital media content stored by a network based mass storage system providing archival storage of the digital media content.

5. The method of claim 4, wherein the network based mass storage system comprises the processor-based system presenting the one or more of the plurality of event collections in relation to the temporal scale.

6. The method of claim 1, wherein the digital media content from which the event content is identified further comprises digital media content of the first user associated with the user device.

7. The method of claim 6, wherein the digital media content from which the event content is identified further comprises digital media content of a contributor designated by the first user, wherein the designation by the first user includes information identifying a location where the digital media content of the contributor may be retrieved.

8. The method of claim 6, wherein the digital media content from which the event content is identified further comprises digital media content from either or both of a public source of digital media content and a commercial source of digital media content.

9. The method of claim 1, wherein generating a collection of the collections of digital media content as an event collection from the event content of a corresponding event epoch of the plurality of predefined event epochs comprises:
  analyzing, by a processor-based system, the predefined event criteria to identify digital media content meeting the predefined event criteria.

10. The method of claim 9, wherein the predefined event epochs further comprise predefined content criteria including either or both of an included tag and an excluded tag, wherein a tag comprises information appended to the digital media content regarding an aspect of the digital media content, wherein generating the collection as an event collection comprises:
  analyzing, by the processor-based system, the predefined content criteria to identify digital media content meeting the predefined content criteria.

11. The method of claim 10, wherein the analyzing the predefined content criteria to identify digital media content meeting the predefined content criteria comprises:
  determining whether a tag associated with digital media content matches an included tag and, if the digital media content otherwise meets the predefined event criteria and content criteria, including the digital media content as event content of the corresponding event epoch.

12. The method of claim 10, wherein the analyzing the predefined content criteria to identify digital media content meeting the predefined event criteria comprises:
  determining whether a tag associated with digital media content matches an excluded tag and excluding the digital media content from event content of the corresponding event epoch.

13. The method of claim 9, wherein the predefined event epochs further comprise predefined content criteria including either or both of an included key and an excluded key, wherein a key comprises information contained within the digital media content, wherein generating the collection as an event collection comprises:
  analyzing, by the processor-based system, the predefined content criteria to identify digital media content meeting the predefined content criteria.

14. The method of claim 13, wherein the analyzing the predefined content criteria to identify digital media content meeting the predefined event criteria comprises processing selected from the group consisting of using machine vision object recognition logic to identify an object as a key within the digital media content, using face recognition logic to identify a person as a key within the digital media content, and using character recognition logic to identify subject matter within the digital media content.

15. The method of claim 13, wherein the analyzing the predefined content criteria to identify digital media content meeting the predefined content criteria comprises:
  determining whether a key within digital media content matches an included key and, if the digital media content otherwise meets the predefined event criteria and content criteria, including the digital media content as event content of the corresponding event epoch.

16. The method of claim 13, wherein the analyzing the predefined content criteria to identify digital media content meeting the predefined content criteria comprises:
  determining whether a key within digital media content matches an excluded key and excluding the digital media content from event content of the corresponding event epoch.

17. The method of claim 1, the predefined event epochs further comprise predefined aspects of the event collection, wherein the predefined event collection aspects include an aspect selected from the group consisting of relative event significance level, sharing scope, and contributor group for a corresponding one of the event collections.

18. The method of claim 1, wherein presenting the one or more of the plurality of event collections to a user device in relation to a temporal scale comprises:
  presenting a plurality of the event collections in a relative relationship along the temporal scale according to a temporal criteria of their corresponding event epoch.

19. The method of claim 18, further comprising:
  selecting particular ones of the event collections included in the plurality of event collections presented based upon relative event significance level information for each event collection provided by their corresponding event epoch.

20. The method of claim 19, further comprising:
implementing a change in scale of the temporal scale under control of the user device; and
adding or removing event collections from the particular ones of the event collections included in the plurality of event collections presented based upon the relative event significance level information and a level of the temporal scale after the change in scale.

21. The method of claim 1, wherein presenting the one or more of the plurality of event collections to a user device in relation to a temporal scale comprises:
presenting a plurality of the event content of an event collection in a relative relationship along the temporal scale according to temporal information of the event content.

22. The method of claim 7, wherein the information identifying the location where the digital media content of the contributor may be retrieved comprises a user name associated with the contributor, a user account associated with the contributor, a network address associated with the contributor, digital media content library path associated with the contributor, or a combination thereof, and wherein the contributor is a third party with respect to the user.

23. The method of claim 1, wherein at least the portion of the digital media content of the first user is stored at a first user device of the first user, and at least the portion of the digital media content of the second user is stored at a second user device of the second user, and wherein access to the first user account and the second user account to present at least the portion of the digital media content of the first user and at least the portion of the digital media content of the second user is provided by accessing the first user device and the second user device, respectively.

24. The method of claim 1, wherein at least the portion of the digital media content of the first user and at least the portion of the digital media content of the second user are stored at a backup and restore system provided by a backup and restore service provider, and wherein the first user account and the second user account are associated with subscriptions to a backup and restore service provided by the backup and restore system.

25. A method comprising:
defining an event epoch for use in generating a corresponding event collection comprising event content identified from one or more libraries of digital media content, wherein the event epoch definition comprises one or more event criteria, one or more content criteria, and one or more aspects of the event collection;
identifying digital media content from the one or more libraries of digital media content as the event content using the event epoch definition;
generating the event collection comprising a plurality of digital media content identified as event content; and
presenting, by operation of a processor-based system and in accordance with the one or more aspects of the event collection, the event collection to a user device in relation to a temporal scale, wherein presenting the event collection includes:
determining hierarchy information associated the plurality of digital media content of the event collection;
determining prominence information associated with the plurality of digital media content of the event collection based on the hierarchy information, wherein the prominence information indicates whether particular event content is presented in the foreground or background relative to other event content of the event collection;
determining a scale level of the temporal scale, wherein a high scale level indicates that the temporal scale is representative of a first time period, wherein a low scale level indicates that the temporal scale is representative of a second time period, wherein the second time period is shorter than the first time period;
presenting the event collection as a single digital media content to represent the event content at a particular position along the temporal scale when the scale level of the temporal scale is high; and
presenting the event collection as individual media content of the event content at a plurality of positions along the temporal scale when the scale level of the temporal scale is low.

26. The method of claim 25, wherein the one or more event criteria comprise a temporal criteria and a location criteria.

27. The method of claim 25, wherein the one or more content criteria comprise criteria regarding subject matter of the digital media content to be identified as event content.

28. The method of claim 27, wherein the one or more content criteria comprise either or both of an included tag and an excluded tag, wherein a tag comprises information appended to the digital media content regarding an aspect of the digital media content.

29. The method of claim 27, wherein the one or more content criteria comprise either or both of an included key and an excluded key, wherein a key comprises information contained within the digital media content.

30. The method of claim 25, wherein the one or more aspects of the event collection comprise a sharing scope information for the event collection.

31. The method of claim 30, wherein the presenting utilizes the sharing scope information in determining users to which the event collection is presented.

32. The method of claim 25, wherein the one or more aspects of the event collection comprise contributor information for the event collection.

33. The method of claim 32, wherein the contributor information is utilized to determine users who are authorized to contribute digital media content to the event content and in determining rights of users with respect to presenting the event collection.

34. The method of claim 25, wherein the one or more aspects of the event collection comprise event level information for the event collection.

35. The method of claim 34, wherein the event level information is used in determining the scale level of the temporal scale.

36. The method of claim 25, wherein the digital media content identified as event content of the event collection comprises a plurality of different digital media, wherein the plurality of different digital media comprises at least two media types from the group consisting of photographs, videos, sound files, and documents.

37. The method of claim 25, wherein the digital media content identified as event content of the event collection comprises digital media content from one or more contributors identified in the event epoch definition, wherein the event epoch definition includes information identifying a location where the digital media content from the one or more contributors may be retrieved.

38. The method of claim 25, further comprising:
providing a slider that facilitates traversal of the temporal scale; and presenting additional information based on a time period indicated by the position of the slider along the temporal scale, wherein the additional information is different from the digital media content of a particular event collection corresponding to the time period indicated by the position of the slider.

39. A system comprising:
a database storing one or more libraries of digital media content;
one or more processors configured to provide:
a digital media content indexing system adapted to analyze digital media content of the one or more libraries of digital media content using information associated with predefined event epochs to identify digital media content as event content for a plurality of event collections corresponding to respective ones of the predefined event epochs, wherein the digital media content indexing system generates the plurality of event collections each including respective identified event content; and
an event gallery interface presenting one or more event collections of the plurality of event collections to a user device in relation to a temporal scale, wherein the event collections are presented as a plurality of discrete events at positions along the temporal scale corresponding to temporal criteria of their corresponding event epoch information, wherein the event gallery interface:
determines hierarchy information associated each of the plurality of event collections;
determines a prominence associated with each of the one or more event collections based on the hierarchy information, wherein the prominence indicates whether a particular event collection is presented in the foreground or background relative to other event collections of the one or more event collections;
determines a scale level of the temporal scale, wherein a high scale level indicates that the temporal scale is representative of a first time period, wherein a low scale level indicates that the temporal scale is representative of a second time period, wherein the second time period is shorter than the first time period;
presents the event collection as a single digital media content to represent the event content at a particular position along the temporal scale when the scale level of the temporal scale is high; and
presents the event collection as individual media content of the event content at a plurality of positions along the temporal scale when the scale level of the temporal scale is low.

40. The system of claim 39, wherein the digital media content identified as event content and presented in a same event collection comprises a plurality of different digital media, wherein the plurality of different digital media comprises at least two media types from the group consisting of photographs, videos, sound files, and documents.

41. The system of claim 39, wherein the digital media content indexing system is part of a network based mass storage system providing archival storage of the digital media content.

42. The system of claim 41, wherein the digital media content from which the event content is identified comprises digital media content stored by a network based mass storage system providing archival storage of the digital media content.

43. The system of claim 39, wherein the user device comprises one of a plurality of different processor-based system platforms supported by the event gallery interface.

44. The system of claim 43, wherein the plurality of different processor-based system platforms include at least two processor-based system platforms selected from the group consisting of a personal computers (PC), a personal entertainment system (PES), a personal digital assistant (PDA), and a personal communication system (PCS).

45. The system of claim 39, wherein the information of the predefined event epochs includes one or more event criteria, one or more content criteria, and one or more aspects of the event collection.

46. The system of claim 45, wherein the one or more event criteria comprise a temporal criteria and a location criteria.

47. The system of claim 45, wherein the one or more content criteria comprise criteria regarding subject matter of the digital media content to be identified as event content.

48. The system of claim 45, wherein the one or more aspects of the event collection comprise a sharing scope information for the event collection.

49. The system of claim 48, wherein the event gallery interface utilizes the sharing scope information in determining users to which the event collection is presented.

50. The system of claim 45, wherein the one or more aspects of the event collection comprise contributor information for the event collection, wherein the event gallery interface utilizes the contributor information to determine users who are authorized to contribute digital media content to the event content and to determine rights of users with respect to presenting the event collection, wherein users identified by the contributor information have a first set of rights, and wherein other users have a second set of rights, the first set of rights including viewing rights, copying rights, and downloading rights, and the second set of rights including viewing rights, but not copying or downloading rights.

51. The system of claim 45, wherein the one or more aspects of the event collection comprise event level information for the event collection.

52. The system of claim 51, wherein the event gallery interface utilizes the event level information to determine the scale level of the temporal scale.

53. The system of claim 39, wherein the digital media content indexing system comprises logic operable to analyze content criteria of a corresponding one of the predefined event epochs to identify digital media content of an event collection of the plurality of event collections.

54. The system of claim 53, wherein the logic comprises machine vision object recognition logic operable to identify an object within the digital media content.

55. The system of claim 53, wherein the logic comprises face recognition logic operable to identify a person within the digital media content.

56. The system of claim 53, wherein the logic comprises character recognition logic operable to identify subject matter within the digital media content.

57. The system of claim 39, wherein the event gallery interface presents a plurality of the event collections in a relative relationship along the temporal scale according to the temporal criteria of their corresponding event epoch.

58. The system of claim 57, wherein the event gallery interface operates to select particular ones of the event collections included in the plurality of event collections presented based upon relative event significance level information for each event collection provided by their corresponding event epoch.

59. The system of claim 58, wherein the event gallery interface operates to implement a change in the scale of the temporal scale under control of the user device and to add or remove event collections from the particular ones of the event collections included in the plurality of event collections presented based upon the relative event significance level information and a level of the temporal scale after the change in scale.

60. The system of claim 39, wherein the one or more libraries of digital media content from which event content of an event collection is identified comprise an archival database of digital media content.

61. The system of claim 60, wherein the one or more libraries of digital media content from which event content of an event collection is identified further comprises a library of a contributor designated by the predefined event epoch for the event collection, wherein the library of the contributor is designated by a user and includes information identifying a location where the digital media content of the contributor may be retrieved.

62. The system of claim 60, wherein the one or more libraries of digital media content from which event content of an event collection is identified further comprises a library of publically available digital media content.

63. The system of claim 60, wherein the one or more libraries of digital media content from which event content of an event collection is identified further comprises a library of commercially available digital media content.

\* \* \* \* \*